United States Patent Office 3,074,947
Patented Jan. 22, 1963

3,074,947
4,6-DIAMINO-1,2-DIHYDRO-2-LOWER ALKYL-1-ARYL-s-TRIAZINE SALTS OF PAMOIC ACID
Edward F. Elslager and Donald F. Worth, Ann Arbor, Mich., assignors to Parke, Davis & Company, Detroit, Mich., a corporation of Michigan
No Drawing. Filed Jan. 23, 1961, Ser. No. 83,909
6 Claims. (Cl. 260—249.9)

The present invention relates to salts of 4,6-diamino-1,2-dihydro-2-lower alkyl-1-aryl-s-triazines of the formula

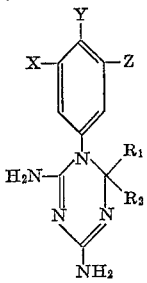

where X represents hydrogen, halogen, methyl or trifluoromethyl; each of Y and Z represents hydrogen, halogen, lower alkyl, lower alkoxy, lower alkylthio or trifluoromethyl, at least one of X, Y and Z being hydrogen; $R_1$ represents lower alkyl and $R_2$ represents hydrogen or methyl; with 4,4'-methylenebis(3-hydroxy-2-napthoic acid), or pamoic acid of the formula

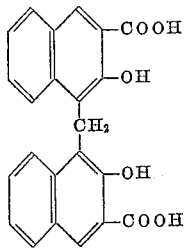

and to methods for their production. As used in the foregoing definitions, "halogen" designates a fluorine, chlorine, bromine or iodine atom and the lower alkyl radicals are those containing fewer than five carbon atoms.

The compounds of the invention are produced by reacting a 4,6-diamino-1,2-dihydro-2-lower alkyl-1-aryl-s-triazine of the foregoing formula with 4,4'-methylenebis-(3-hydroxy-2-naphthoic acid); or by reacting a soluble salt of the 4,6-diamino-1,2-dihydro-2-lower alkyl-1-aryl-s-triazine with a soluble salt of 4,4'-methylenebis-(3-hydroxy-2-naphthoic acid). The term "soluble salt" is used herein in a relative sense and means a degree of solubility substantially greater than that exhibited by the products of the invention. Representative soluble salts of the triazine base suitable for use in the process of the invention include the hydrochloride, hydrobromide, hydriodide, sulfate, phosphate, sulfamate, acetate, lactate, tartrate, gluconate, citrate, and salicylate. Representative soluble salts of 4,4'-methylenebis(3-hydroxy-2-napthoic acid) suitable for use in the process of the invention include the alkali metal, alkaline earth metal, ammonium and amine salts. The invention comprehends the starting materials and final products in their hydrated as well as anhydrous forms. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, by treatment of an acid-addition salt with a base, or by treatment of the triazine base with an acid. The process of the invention is preferably carried out in a solvent in which the reactants are at least partially soluble and which is relatively unreactive toward each of the reactants. Suitable solvents include water, aqueous alkanols, dimethylacetamide, acetonitrile and mixtures thereof. Other satisfactory reaction media can be chosen from among a wide variety of solvents, particularly those which are neutral and polar. The salt formation proceeds fairly rapidly upon mixing the reactants in the selected solvent. The process can be carried out at room temperature or below, although in many cases a high yield and a crystalline form conducive to rapid filtration are facilitated by heating the reaction mixture for up to about an hour and then chilling it. The reactants are customarily employed in approximately the same ratio in which they appear in the desired final product. If it is desired to obtain the salt of the triazine base with one-half formula weight of 4,4'-methylenebis(3-hydroxy-2-naphthoic acid) it is customary to employ these reactants or soluble salts thereof in the ratio of 2 moles of the former to 1 mole of the latter. If it is desired to obtain the salt of the triazine base with one formula weight of 4,4'-methylenebis(3-hydroxy-2-naphthoic acid) best results are obtained by reacting a soluble salt of the triazine base with an equimolar quantity of a soluble salt (such as the disodium salt) of 4,4'-methylenebis(3-hydroxy-2-naphthoic acid) in the presence of one equivalent of a mineral acid. In those cases where the reaction product precipitates directly it is isolated by filtration or centrifugation. In those instances where it does not precipitate directly it is first made insoluble by concentration of the reaction mixture or by dilution of the reaction mixture with a solvent in which the product is insoluble, and then collected.

The 4,6-diamino-1,2-dihydro-2-lower alkyl-1-aryl-s-triazines and their soluble salts used as starting materials in the practice of the invention can be prepared in various ways. They can be obtained by reacting a 1-arylbiguanide of the formula

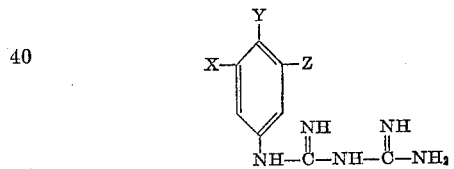

with a lower aliphatic aldehyde or ketone of the formula

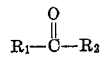

in the presence of a strong acid; where X, Y, Z, $R_1$ and $R_2$ are as defined before. The 1-arylbiguanides can be obtained by the reaction of an aniline derivative of the formula

with dicyandiamide in the presence of a strong acid; where X, Y and Z are as defined before. Alternatively, the aniline derivative, the aldehyde or ketone and dicyandiamide are reacted in the presence of a strong acid and the desired triazine derivative is obtained directly. This method is preferred in those cases where $R_1$ and $R_2$ are both lower alkyl groups. The desired triazine derivative is obtained directly from the reaction mixture as an acid-addition salt or, as the free base following basification.

The products of the invention are pharmacological agents which exhibit various advantages including lack of irritation at the site of injection when used parenterally, and unusually long duration of action. Those compounds substituted at positions 3 and 5 of the phenyl ring (that is, the compounds wherein Y is hydrogen and X and Z are other substituents, preferably halogen, methyl or trifluoromethyl) are particularly useful as repository antibacterial agents. Those products of the invention which are unsubstituted in the phenyl ring or have substituents only at either or both of the positions 3 and 4 (corresponding to substituents Y and Z) are useful primarily as repository antimalarial agents. Such compounds as 4,6-diamino - 1-(p-chlorophenyl)-1,2-dihydro-2,2-dimethyl-s-triazine hydrochloride and 4,6-diamino-1-(3,4-dichlorophenyl)-1,2-dihydro-2,2-dimethyl-s-triazine hydrochloride are known to be highly active antimalarial agents, although their usefulness is limited by their extremely short duration of action. Even when administered at intervals of less than a week these compounds are too rapidly excreted to exhibit a sustained effect. In addition they are irritating upon injection. However, the products of the present invention possess high antimalarial activity, are non-irritating upon injection, and exhibit such long duration of action that the dosage interval can be extended to as long as several months without loss of protection against a malaria challenge. The products of the invention can be formulated into suspensions which are pharmaceutically acceptable for intramuscular injection, using suspending vehicles such as 40% benzyl benzoate–60% castor oil, or water containing emulsifying or dispersing agents.

The invention is illustrated but not limited by the following examples.

Example 1

A solution of 19.7 g. of 4,4'-methylenebis(3-hydroxy-2-naphthoic acid) disodium salt monohydrate in 500 ml. of water is poured with vigorous stirring into a solution of 25.2 g. of 4,6-diamino-1-(p-chlorophenyl)-1,2-dihydro-2,2-dimethyl-s-triazine monohydrochloride in 500 ml. of hot water. The mixture is stirred and heated on a steam bath for 15 minutes and the insoluble product which separates is collected on a filter, washed with water and dried in vacuo at 70° C. for 18 hours. This product is the 4,6-diamino-1-(p-chlorophenyl) - 1,2 - dihydro-2,2 - dimethyl-s-triazine salt with one-half formula weight 4,4'-methylenebis(3-hydroxy-2-naphthoic acid); yellow crystals, M.P. 231–234° C., following crystallization from a dimethyl sulfoxide-water mixture. The structural formula is

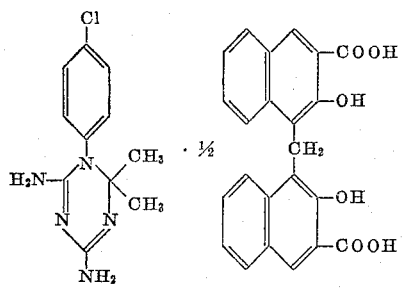

By the foregoing procedure and the reagents hereinafter indicated, the following additional compounds are prepared. Depending on the drying procedure used, they are obtained either as hydrates or in the anhydrous form.

(a) From 1.50 g. of 4,6-diamino-1-(m-fluorophenyl)-1,2-dihydro-2,2-dimethyl - s - triazine monohydrochloride and 1.24 g. of 4,4'-methylenebis(3-hydroxy-2-naphthoic acid) disodium salt monohydrate, there is obtained the 4,6 - diamino - 1 - (m - fluorophenyl)-1,2-dihydro-2,2-dimethyl-s-triazine salt with one-half formula weight 4,4'-methylenebis(3-hydroxy-2-naphthoic acid); M.P. indistinct beginning at 190° C. following crystallization from methanol-water.

(b) From 2.50 g. of 4,6-diamino-1-(m-chlorophenyl)-1,2 - dihydro - 2,2-dimethyl-s-triazine monohydrochloride and 1.96 g. of 4,4'-methylenebis(3-hydroxy-2-naphthoic acid) disodium salt monohydrate, there is obtained the 4,6 - diamino - 1 - (m - chlorophenyl)-1,2-dihydro-2,2-dimethyl-s-triazine salt with one-half formula weight 4,4'-methylenebis(3-hydroxy-2-naphthoic acid); M.P. indistinct beginning at 190° C. following crystallization from methanol-water.

(c) From 9.00 g. of 4,6-diamino-1-(m-bromophenyl)-1,2 - dihydro - 2,2-dimethyl-s-triazine monohydrochloride and 6.08 g. of 4,4'-methylenebis(3-hydroxy-2-naphthoic acid) disodium salt monohydrate, there is obtained the 4,6 - diamino - 1 - (m-bromophenyl)-1,2-dihydro-2,2-dimethyl-s-triazine salt with one-half formula weight 4,4'-methylenebis(3-hydroxy-2-naphthoic acid); M.P. indistinct beginning at 180° C.

(d) From 10.00 g. of 4,6-diamino-1,2-dihydro-2,2-dimethyl-1-phenyl-s-triazine monohydrochloride and 8.86 g. of 4,4'-methylenebis(3-hydroxy-2-naphthoic acid) disodium salt monohydrate, there is obtained the 4,6-diamino - 1,2 - dihydro-2,2-dimethyl-1-phenyl-s-triazine salt with one-half formula weight 4,4'-methylenebis-(3-hydroxy-2-naphthoic acid); M.P. indistinct beginning at 200° C. following crystallization from methanol-water.

(e) From 6.00 g. of 4,6-diamino-1,2-dihydro-1-(m-methoxyphenyl) - 2,2-dimethyl-s-triazine monohydrochloride and 4.76 g. of 4,4'-methylenebis(3-hydroxy-2-naphthoic acid) disodium salt monohydrate, there is obtained the 4,6-diamino-1,2-dihydro-1-(m-methoxyphenyl)-2,2-dimethyl-s-triazine salt with one-half formula weight 4,4'-methylenebis(3-hydroxy-2-naphthoic acid); M.P. indistinct beginning at 205° C. following crystallization from methanol-water.

(f) From 9.00 g. of 4,6-diamino-1-(m-ethoxyphenyl)-1,2 - dihydro - 2,2-dimethyl-s-triazine monohydrochloride and 7.75 g. of 4,4'-methylenebis(3-hydroxy-2-naphthoic acid) disodium salt monohydrate, there is obtained the 4,6 - diamino - 1 - (m-ethoxyphenyl)-1,2-dihydro-2,2-dimethyl-s-triazine salt with one-half formula weight 4,4'-methylenebis(3-hydroxy-2-naphthoic acid); M.P. indistinct beginning at 175° C. following crystallization from ethanol-water.

(g) From 6.5 g. of 4,6-diamino-1-(p-ethoxyphenyl)-1,2-dihydro-2,2-dimethyl-s-triazine monohydrochloride and 4.90 g. of 4,4'-methylenebis(3-hydroxy-2-naphthoic acid) disodium salt monohydrate, there is obtained the 4,6-diamino - 1 - (p-ethoxyphenyl)-1,2-dihydro-2,2-dimethyl-s-triazine salt with one-half formula weight 4,4'-methylenebis(3-hydroxy-2-naphthoic acid); M.P. indistinct beginning at 190° C. following crystallization from methanol-water.

(h) From 15.0 g. of 4,6-diamino-1,2-dihydro-2,2-dimethyl - 1 - (m-methylthiophenyl)-s-triazine monohydrochloride and 11.3 g. of 4,4'-methylenebis(3-hydroxy-2-naphthoic acid) disodium salt monohydrate, there is obtained the 4,6 - diamino-1,2-dihydro-2,2-dimethyl-1-(m-methylthiophenyl)-s-triazine salt with one-half formula weight 4,4'-methylenebis(3-hydroxy-2-naphthoic acid); M.P. 191–193° C. following crystallization from acetonitrile-water.

(i) From 13.6 g. of 4,6-diamino-1,2-dihydro-2,2-dimethyl-1-($\alpha,\alpha,\alpha$,4-tetrafluoro-m-tolyl)-s-triazine monohydrochloride and 9.0 g. of 4,4'-methylenebis(3-hydroxy-2-naphthoic acid) disodium salt monohydrate, there is obtained the 4,6-diamino-1,2-dihydro-2,2-dimethyl-1-($\alpha,\alpha$,$\alpha$,4-tetrafluoro-m-tolyl)-s-triazine salt with one-half formula weight 4,4'-methylenebis(3-hydroxy-2-napthhoic acid); M.P. 180–183° C. following crystallization from acetonitrile-water.

(j) From 12.9 g. of 4,6-diamino-1-(3,4-dichlorophenyl) - 1,2-dihydro-2,2-dimethyl-s-triazine monohydrochloride and 9.0 g. of 4,4'-methylenebis(3-hydroxy-2-naphthoic acid) disodium salt monohydrate, there is obtained the 4,6-diamino-1-(3,4-dichlorophenyl)-1,2-dihydro-2,2-dimethyl-s-triazine salt with one-half formula weight 4,4'-methylenebis(3-hydroxy-2-naphthoic acid); M.P. indistinct beginning at 213° C. following crystallization from acetonitrile-water.

(k) From 15.2 g. of 4,6-diamino-1-(p-iodophenyl)-1,2-dihydro-2,2-dimethyl-s-triazine monohydrochloride and 9.0 g. of 4,4'-methylenebis(3-hydroxy-2-naphthoic acid) disodium salt monohydrate, there is obtained the 4,6-diamino - 1 - (p-iodophenyl)-1,2-dihydro-2,2-dimethyl-s-triazine salt with one-half formula weight 4,4'-methylenebis(3-hydroxy-2-naphthoic acid); M.P. 212° C. (decomposition) following crystallization from acetonitrile-water.

(l) From 5.0 g. of 4,6-diamino-1-(p-bromophenyl)-1,2-dihydro-2,2-dimethyl-s-triazine monohydrochloride and 3.38 g. of 4,4'-methylenebis(3-hydroxy-2-naphthoic acid) disodium salt monohydrate, there is obtained the 4,6-diamino - 1 - (p-bromophenyl)-1,2-dihydro-2,2-dimethyl-s-triazine salt with one-half formula weight 4,4'-methylenebis(3-hydroxy-2-naphthoic acid); chartreuse crystals, M.P. 230–235° C.

(m) From 4.0 g. of 4,6-diamino-1,2-dihydro-1-(p-methoxyphenyl)-2,2-dimethyl-s-triazine monohydrochloride and 3.17 g. of 4,4'-methylenebis(3-hydroxy-2-naphthoic acid) disodium salt monohydrate, there is obtained the 4,6-diamino-1,2-dihydro-1-(p-methoxyphenyl)-2,2-dimethyl-s-triazine salt with one-half formula weight 4,4'-methylenebis(3-hydroxy-2-naphthoic acid); pale yellow crystals, M.P. 264–267° C., following crystallization from dimethyl sulfoxide-water.

(n) From 1.97 g. of 4,6-diamino-1-(m-chlorophenyl)-1,2-dihydro-2-propyl-s-triazine monohydrochloride and 1.46 g. of 4,4'-methylenebis(3-hydroxy-2-naphthoic acid) disodium salt monohydrate, there is obtained the 4,6-diamino-1-(m-chlorophenyl)-1,2-dihydro-2-propyl-s-triazine salt with one-half formula weight 4,4'-methylenebis(3-hydroxy-2-naphthoic acid); M.P. 175° C. (decomposition) following crystallization from acetonitrile-water or methanol-water.

(o) From 9.0 g. of 4,6-diamino-1,2-dihydro-2,2-dimethyl-1-p-tolyl-s-triazine monohydrochloride and 7.55 g. of 4,4'-methylenebis(3-hydroxy-2-naphthoic acid) disodium salt monohydrate, there is obtained the 4,6-diamino-1,2-dihydro-2,2-dimethyl-1-p-tolyl-s-triazine salt with one-half formula weight 4,4'-methylenebis(3-hydroxy-2-naphthoic acid); M.P. indistinct beginning at 200° C. following crystallization from methanol-water.

(p) From 10.42 g. of 4,6-diamino-1,2-dihydro-2,2-dimethyl-1-(p-methylthiophenyl)-s-triazine monohydrochloride and 7.65 g. of 4,4'-methylenebis(3-hydroxy-2-naphthoic acid) disodium salt monohydrate, there is obtained the 4,6-diamino-1,2-dihydro-2,2-dimethyl-1-(p-methylthiophenyl)-s-triazine salt with one-half formula weight 4,4'-methylenebis(3-hydroxy-2-naphthoic acid); M.P. 234–236.5° C. following trituration with acetonitrile-water.

(q) From 3.54 g. of 4,6-diamino-1,2-dihydro-2,2-dimethyl-1-(α,α,α-trifluoro-p-tolyl) - s - triazine monohydrochloride and 2.47 g. of 4,4'-methylenebis(3-hydroxy-2-naphthoic acid) disodium salt monohydrate, there is obtained the 4,6-diamino-1,2-dihydro-2,2-dimethyl-1-(α,α,α-trifluoro-p-tolyl)-s-triazine salt with one-half formula weight 4,4'-methylenebis(3-hydroxy-2-naphthoic acid); M.P. 211° C. following crystallization from acetonitrile-water.

(r) From 10.49 g. of 4,6-diamino-1-(3,4-dichlorophenyl)-1,2-dihydro-2-methyl-s-triazine monohydrochloride and 7.65 g. 4,4'-methylenebis(3-hydroxy-2-naphthoic acid) disodium salt monohydrate, there is obtained the 4,6-diamino-1-(3,4-dichlorophenyl)-1,2-dihydro-2-methyl-s-triazine salt with one-half formula weight 4,4'-methylenebis(3-hydroxy-2-naphthoic acid); pale yellow crystals from acetonitrile-water.

(s) From 3.80 g. of 4,6-diamino-1-(3-chloro-p-tolyl)-1,2-dihydro - 2,2-dimethyl-s-triazine monohydrochloride and 2.75 g. of 4,4'-methylenebis(3-hydroxy-2-naphthoic acid) disodium salt monohydrate, there is obtained the 4,6-diamino-1-(3-chloro-p-tolyl)-1,2-dihydro-2,2- dimethyl-s-triazine salt with one-half formula weight 4,4'-methylenebis(3-hydroxy-2-naphthoic acid); M.P. 225° C. (decomposition) following crystallization from dimethyl sulfoxide-water.

(t) From 10.6 g. of 4,6-diamino-1-(p-chlorophenyl-1,2-dihydro-2-methyl-s-triazine monohydrochloride and 8.68 g. of 4,4'-methylenebis(3-hydroxy-2-naphthoic acid) disodium salt monohydrate, there is obtained the 4,6-diamino-1-(p-chlorophenyl)-1,2-dihydro - 2 - methyl-s-triazine salt with one-half formula weight 4,4'-methylenebis(3-hydroxy-2-naphthoic acid); M.P. indistinct beginning at 188° C. following crystallization from methanol-water.

(u) From 14.4 g. of 4,6-diamino-1-(p-chlorophenyl)-1,2-dihydro-2-ethyl-s-triazine monohydrochloride and 11.25 g. of 4,4'-methylenebis (3-hydroxy-2-naphthoic acid) disodium salt monohydrate, there is obtained the 4,6-diamino-1-(p-chlorophenyl)-1,2-dihydro-2-ethyl-s- triazine salt with one-half formula weight 4,4'-methylenebis(3-hydroxy-2-naphthoic acid); M.P. 208° C. (decomposition) following crystallization from methanol-water.

(v) From 2.12 g. of 4,6-diamino-1,2-dihydro-2,2-dimethyl-1-(α,α,α-trifluoro-m-tolyl)-s-triazine monohydrochloride and 1.48 g. of 4,4'-methylenebis(3-hydroxy-2-naphthoic acid) disodium salt monohydrate, there is obtained the 4,6-diamino-1,2-dihydro-2,2-dimethyl-1-(α,α,α-trifluoro-m-tolyl)-s-triazine salt with one-half formula weight 4,4'-methylenebis-(3-hydroxy-2-naphthoic acid); M.P. 168–170° C. following crystallization from ethylene glycol monomethyl ether-water.

(w) From 38.0 g. of 4,6-diamino-1-(p-bromo-α,α,α-trifluoro-m-tolyl)-1,2-dihydro-2,2-dimethyl-s-triazine monohydrochloride and 21.4 g. of 4,4'-methylenebis(3-hydroxy-2-naphthoic acid) disodium salt monohydrate, there is obtained the 4,6-diamino-1-(p-bromo-α,α,α-trifluoro-m-tolyl)-1,2-dihydro-2,2-dimethyl-s-triazine salt with one-half formula weight 4,4'-methylenebis(3-hydroxy-2-naphthoic acid); M.P. 189° C. (decomposition) following crystallization from acetonitrile-water.

(x) From 5.17 g. of 4,6-diamino-1-(3,5-dichlorophenyly) - 1,2-dihydro-2,2-dimethyl-s-triazine monohydrochloride and 3.6 g. of 4,4'-methylenebis(3-hydroxy-2-naphthoic acid) disodium salt monohydrate, there is obtained the 4,6-diamino-1-(3,5-dichlorophenyl)-1,2-dihydro-2,2-dimethyl-a-triazine salt with one-half formula weight 4,4'-methylenebis(3-hydroxy-2-naphthoic acid); M.P. 221° C. following crystallization from methanol-water.

(y) From 3.22 g. of 4,6-diamino-1-(5-bromo-m-tolyl)-1,2-dihydro-2,2 - dimethyl-s-triazine monohydrochloride and 2.08 g. of 4,4'-methylenebis(3-hydroxy-2-naphthoic acid) disodium salt monohydrate, there is obtained the 4,6-diamino-1-(5-bromo-m-tolyl)-1,2-dihydro - 2,2 - dimethyl-s-triazine salt with one-half formula weight 4,4'-methylenebis(3-hydroxy-2-naphthoic acid); M.P. indistinct beginning at 200° C.

(z) From 4.12 g. of 4,6-diamino-(3,5-dibromophenyl)-1,2-dihydro-2,2 - dimethyl-s-triazine monohydrochloride and 2.25 g. of 4,4'-methylenebis(3-hydroxy-2-naphthoic acid) disodium salt monohydrate, there is obtained the 4,6-diamino-1-(3,5-dibromophenyl)-1,2-dihydro - 2,2 - dimethyl-s-triazine salt with one-half formula weight 4,4'-methylenebis(3-hydroxy-2-naphthoic acid); M.P. 210° C. (decomposition).

(aa) From 1.97 g. of 4,6-diamino-1-($\alpha^3,\alpha^3,\alpha^3,\alpha^5,\alpha^5,\alpha^5$-hexafluoro-3,5-xylyl)-1,2-dihydro-2,2 - dimethyl-s-triazine monohydrochloride and 1.14 g. of 4,4'-methylenebis(3-hydroxy-2-naphthoic acid) disodium salt monohydrate, there is obtained the 4,6-diamino-1-($\alpha^3,\alpha^3,\alpha^3,\alpha^5,\alpha^5,\alpha^5$-hexafluoro-3,5-xylyl)-1,2-dihydro-2,2 - dimethyl-s-triazine salt with one-half formula weight 4,4'-methylenebis(3-hydroxy-2-naphthoic acid); M.P. indistinct beginning at 195° C.

Triazine derivatives required as starting materials in the foregoing procedures can be prepared by the reaction of a substituted aniline, an aldehyde or ketone, and dicyandiamide in the presence of concentrated hydrochloric acid. For example, 560 ml. of concentrated hydrochloric acid and then 538 g. of dicyandiamide are added to a stirred, filtered solution of 765 g. of p-chloroaniline in 2.7 liters of acetone. The resulting clear yellow solution is heated to boiling and maintained under reflux with stirring for 19 hours. The mixture is then filtered while hot, and the product is washed with acetone and dried in vacuo at 50° C. for 48 hours. This product is 4,6-diamino-1-(p-chlorophenyl)-1,2-dihydro - 2,2 - dimethyl-s-triazine monohydrochloride, M.P. 221-229° C. The triazine derivatives can also be obtained by reacting a 1-arylbiguanide with an aldehyde or ketone in the presence of a strong acid. For example, a mixture of 67 g. of p-chloroaniline, 43 ml. of concentrated hydrochloric acid, 42 g. of dicyandiamide and 170 ml. of water is stirred and boiled under reflux for one hour. An additional 500 ml. of hot water is added, and the resulting solution is decolorized with charcoal, filtered and cooled. The colorless crystals of p-chlorophenylbiguanide hydrochloride which separate are collected on a filter, washed with ethanol and dried in vacuo at 60° C. for 18 hours; M.P. 246-248° C. A suspension of 49.6 g. of p-chlorophenylbiguanide hydrochloride, 71 g. of acetone, 9.5 ml. of water and 2 g. of p-toluenesulfonic acid monohydrate is stirred and boiled under reflux for 17 hours. The 4,6-diamino-1-(p-chlorophenyl)-1,2-dihydro-2,2-dimethyl-s-triazine monohydrochloride which separates is collected on a filter, washed with acetone and dried in vacuo at 60° C. for 18 hours; M.P. 220-225° C.

*Example 2*

A solution of 19.7 g. of 4,6-diamino-1,2-dihydro-2,2-dimethyl-1-(3,4-xylyl)-s-triazine monohydrochloride in 500 ml. of hot methanol is poured with stirring into a solution of 15.7 g. of 4,4'-methylenebis(3-hydroxy-2-naphthoic acid) disodium salt monohydrate in 300 ml. of hot methanol. The mixture is concentrated by distillation and cooled. The yellow crystalline product is collected on a filter, washed with acetone and dried in vacuo at 60° C. for 18 hours. This product is the 4,6-diamino-1,2-dihydro-2,2-dimethyl-1-(3,4-xylyl)-s-triazine salt with one-half formula weight 4,4'-methylenebis(3-hydroxy-2-naphthoic acid); M.P. 228-232° C. following crystallization from methanol-water. The dipotassium salt of 4,4'-methylenebis(3-hydroxy-2-naphthoic acid) can be substituted for the disodium salt in the foregoing procedure. Likewise, other soluble salts of 4,6-diamino-1,2-dihydro-2,2-dimethyl-1-(3,4-xylyl)-s-triazine, such as the sulfate or acetate, can be used in place of the hydrochloride.

*Example 3*

A solution of 0.576 g. of 4,6-diamino-1-(p-chlorophenyl)-1,2-dihydro-2,2-dimethyl-s-triazine monohydrochloride in 5 ml. of hot water is added to a solution of 0.388 g. of 4,4'-methylenebis(3-hydroxy-2-naphthoic acid) in 5 ml. of N,N-dimethylacetamide. 2 ml. of 1.0-normal sodium hydroxide is added quickly and the mixture heated until a bright yellow crystalline solid has formed. The mixture is cooled and the product is collected on a filter and dried. This compound is the 4,6-diamino-1-(p-chlorophenyl)-1,2-dihydro-2,2-dimethyl-s-triazine salt with one-half formula weight 4,4'-methylenebis(3-hydroxy-2-naphthoic acid); M.P. 231-234° C. following crystallization from a dimethyl sulfoxide-water mixture.

*Example 4*

A solution of 4.50 g. of 4,4'-methylenebis(3-hydroxy-2-naphthoic acid) disodium salt monohydrate in 100 ml. of water is poured with vigorous stirring into a solution of 2.88 g. of 4,6-diamino-1-(p-chlorophenyl)-1,2-dihydro-2,2-dimethyl-s-triazine monohydrochloride in 100 ml. of water containing 10 ml. of 1.0-normal hydrochloric acid. The insoluble salt which forms is collected on a filter and dried. It is the 4,6-diamino-1-(p-chlorophenyl)-1,2-dihydro-2,2-dimethyl-s-triazine salt with one formula weight of 4,4'-methylenebis(3-hydroxy-2-naphthoic acid); M.P. indistinct beginning at 225° C. The same compound is obtained by adding 10 ml. of 1.0-normal hydrochloric acid to a solution of 4.50 g. of 4,4'-methylenebis(3-hydroxy-2-naphthoic acid) disodium salt monohydrate in 50 ml. of water and then adding this mixture with vigorous stirring to a solution of 2.88 g. of 4,6-diamino-1-(p-chlorophenyl)-1,2-dihydro-2,2-dimethyl-s-triazine monohydrochloride in 100 ml. of water.

*Example 5*

By a suitable selection of reaction conditions, the foregoing products can be obtained in the desired crystal size. When a solution of 32.6 g. of 4,4'-methylenebis(3-hydroxy-2-naphthoic acid) disodium salt monohydrate in 400 ml. of warm water is poured into a solution of 40.5 g. of 4,6-diamino-1-(p-chlorophenyl)-1,2-dihydro-2,2-dimethyl-s-triazine monohydrochloride in 600 ml. of hot methanol the product which separates is obtained in the form of large crystals. When a solution of 31.6 g. of 4,4'-methylenebis(3-hydroxy-2-naphthoic acid) disodium salt monohydrate in 400 ml. of acetonitrile-water (3:2) is added to a solution of 40.5 g. of 4,6-diamino-1-(p-chlorophenyl)-1,2-dihydro-2,2 - dimethyl-s-triazine monohydrochloride in 600 ml. of acetonitrile-water (3:2) the product which separates is obtained in the form of small yellow needles.

We claim:

1. Salts of a 4,6-diamino-1,2-dihydro-2-lower alkyl-1-aryl-s-triazine of the formula

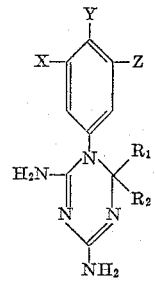

with 4,4' - methylenebis(3-hydroxy-2-naphthoic acid); where X is a member of the class consisting of hydrogen, halogen, methyl and trifluoromethyl; Y and Z are members of the class consisting of hydrogen, halogen, lower alkyl, lower alkoxy, lower alkylthio and trifluoromethyl, at least one of X, Y and Z being hydrogen; $R_1$ is lower alkyl and $R_2$ is a member of the class consisting of hydrogen and methyl.

2. 4,6-diamino-1-(p-chlorophenyl-1,2-dihydro-2,2 - dimethyl-s-triazine salt with one-half formula weight 4,4'-methylenebis(3-hydroxy-2-naphthoic acid).

3. 4,6-diamino - 1,2 - dihydro-2,2-dimethyl-1-(α,α,α-trifluoro-p-tolyl)-s-triazine salt with one-half formula weight 4,4'-methylenebis(3-hydroxy-2-naphthoic acid).

4. 4,6-diamino-1,2-dihydro - 2,2 - dimethyl-1-p-tolyl-s-triazine salt with one-half formula weight 4,4'-methylenebis(3-hydroxy-2-naphthoic acid).

5. 4,6 - diamino - 1,2 - dihydro - 2,2 - dimethyl-1-(3,4-xylyl)-s-triazine salt with one-half formula weight 4,4'-methylenebis(3-hydroxy-2-naphthoic acid).

6. 4,6-diamino-1,2-dihydro - 2,2 - dimethyl-1-(p-methylthiophenyl)-s-triazine salt with one-half formula weight 4,4'-methylenebis(3-hydroxy-2-naphthoic acid).

References Cited in the file of this patent

UNITED STATES PATENTS

| 1,872,826 | Schulemann et al. | Aug. 23, 1932 |
| 2,900,385 | Modest | Aug. 18, 1959 |

FOREIGN PATENTS

| 813,560 | Great Britain | May 21, 1959 |

OTHER REFERENCES

Yale—Journal of Medicinal and Pharmaceutical Chemistry, vol. I, No. 2, pp. 121-33, 1959.

UNITED STATES PATENT OFFICE
CERTIFICATE OF CORRECTION

Patent No. 3,074,947  January 22, 1963

Edward F. Elslager et al.

It is hereby certified that error appears in the above numbered patent requiring correction and that the said Letters Patent should read as corrected below.

Column 6, lines 37 and 38, for "dichlorophenly" read -- dichlorophenyl --; line 42, for "a-triazine" read -- s-triazine --; line 54, before "(3,5-dibromophenyl)" insert -- 1- --; column 8, line 49, after "(p-chlorophenyl", insert a closing parenthesis.

Signed and sealed this 6th day of August 1963.

(SEAL)
Attest:

ERNEST W. SWIDER
Attesting Officer

DAVID L. LADD
Commissioner of Patents